US007942625B2

(12) United States Patent
Sirakov et al.

(10) Patent No.: US 7,942,625 B2
(45) Date of Patent: May 17, 2011

(54) COMPRESSOR AND COMPRESSOR HOUSING

(75) Inventors: Borislav Sirakov, Torrance, CA (US);
Nicolas Deschairattes, Wigan (GB);
Junfei Yin, Cranfield (GB); Nick Nolcheff, Chandler, AZ (US); Gary Vrbas, Torrance, CA (US); Dennis Thoren, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 957 days.

(21) Appl. No.: 11/696,344

(22) Filed: Apr. 4, 2007

(65) Prior Publication Data
US 2008/0247866 A1 Oct. 9, 2008

(51) Int. Cl.
*F04D 27/02* (2006.01)
(52) U.S. Cl. ...................... 415/56.5; 415/58.4
(58) Field of Classification Search .......... 415/52.1, 415/56.5, 58.4, 58.5, 144, 206, 914
See application file for complete search history.

(56) References Cited

U.S. PATENT DOCUMENTS

| 4,990,053 A | | 2/1991 | Rohne | |
| 5,282,718 A | * | 2/1994 | Koff et al. | 415/57.3 |
| 5,586,859 A | * | 12/1996 | Nolcheff | 415/58.5 |
| 5,607,284 A | * | 3/1997 | Byrne et al. | 415/58.5 |
| 5,762,470 A | | 6/1998 | Gelmedov et al. | |
| 6,447,241 B2 | * | 9/2002 | Nakao | 415/1 |
| 7,775,759 B2 | * | 8/2010 | Sirakov et al. | 415/1 |
| 2007/0224032 A1 | * | 9/2007 | Gu et al. | 415/58.4 |

FOREIGN PATENT DOCUMENTS

| EP | 0 348 674 A1 | 1/1990 |
| EP | 1 143 149 A2 | 10/2001 |
| JP | 9-310699 A | 12/1997 |
| WO | WO-2005/121560 A1 | 12/2005 |

OTHER PUBLICATIONS

The European Search Report for European Patent Application No. 08103341.7, dated Apr. 1, 2010.

* cited by examiner

*Primary Examiner* — Edward Look
*Assistant Examiner* — Ryan H Ellis
(74) *Attorney, Agent, or Firm* — Alston & Bird LLP

(57) ABSTRACT

A housing is incorporated as part of a compressor having blades that impart to a fluid a momentum along a main gas flow direction and a swirl. The housing includes a channel that has at least one channel wall and defines an axis substantially aligned with the main gas flow direction. The channel is configured to duct at least some of the fluid. The channel wall defines an internal cavity that extends axially within the channel wall. A bleed passage connects and provides fluid communication between the channel and the cavity. The channel wall defines a plurality of injection passages providing fluid communication between the cavity and the channel at a location spaced in a direction opposite the main gas flow direction from both the bleed passage and the blades. The injection passages have a portion configured to direct fluid from the cavity into the channel with a component along the main gas flow direction and a component opposed to the swirl.

9 Claims, 3 Drawing Sheets

COMPRESSOR AND COMPRESSOR HOUSING

BACKGROUND INFORMATION

Figure 1A:
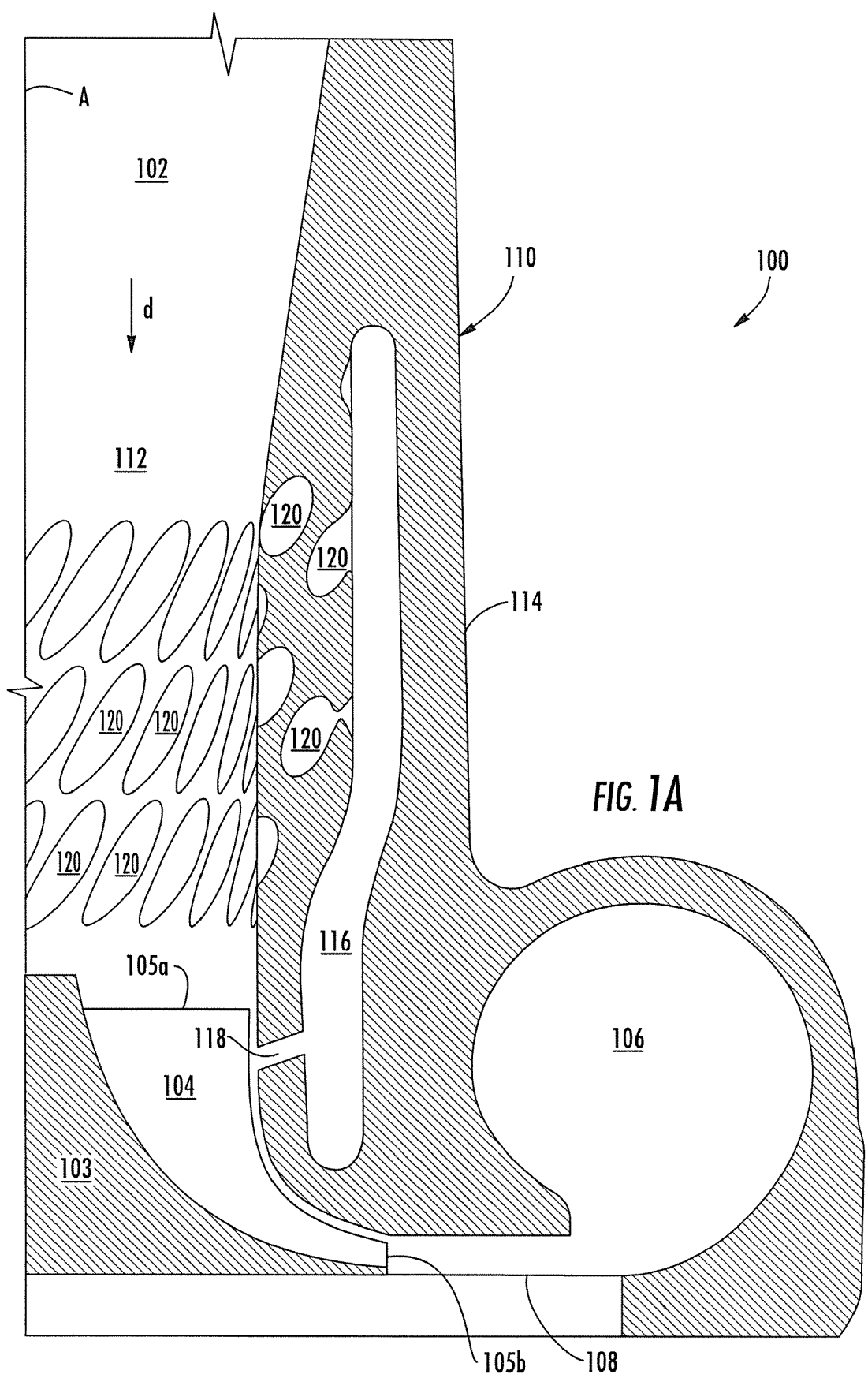

The present disclosure relates to compressors used for compressing a fluid such as air, and more particularly relates to compressors and compressor housings including injection passages for re-circulating a portion of a compressor fluid.

Compressors, such as axial and centrifugal compressors, are used in a variety of applications for compressing fluids. Centrifugal compressors are particularly suitable for applications in which a relatively low overall pressure ratio is needed. A single-stage centrifugal compressor can achieve peak pressure ratios approaching about 4.0 and is much more compact in size than an axial flow compressor of equivalent pressure ratio. Accordingly, centrifugal compressors are commonly used in turbochargers for boosting the performance of gasoline and diesel engines for vehicles.

In various applications, it is important for the compressor to have a wide operating envelope, as measured between the "choke line" at which the mass flow rate through the compressor reaches a maximum possible value because of sonic flow conditions in the compressor blade passages, and the "surge line" at which the compressor begins to surge with reduction in flow at constant pressure ratio or increase in pressure ratio at constant flow. Compressor surge is a compression system instability associated with flow oscillations through the whole compressor system. It is usually initiated by aerodynamic stall or flow separation in one or more of the compressor components as a result of exceeding the limiting flow incidence angle to the compressor blades or exceeding the limiting flow passage loading. For example, in a turbocharger, compressor surge can occur when the engine is operating at high load or torque and low engine speed, or when the engine is operating at a low engine speed with a high rate of exhaust fluid recirculation from the engine exhaust side to the intake side. Compressor surge can also occur when a relatively high specific torque output is required of an engine with a variable nozzle turbine (VNT) or an electrically assisted turbocharger. Additionally, surge can occur when a quick boosting response is required using an electrically assisted turbocharger and/or VNT turbocharger, or when the engine is suddenly decelerated, e.g., if the throttle valve is closed while shifting between gears.

As a result of any of the foregoing operating conditions, the compressor can surge as the axial component of absolute flow velocity entering the compressor is low in comparison to the blade tip speed in the tangential direction, thus resulting in the blades of the compressor operating at a high incidence angle, which leads to flow separation and/or stalling of the blades. Compressor surge can cause severe aerodynamic fluctuation in the compressor, increase the noise of the compressor, and reduce the efficiency of the compressor. In some cases, compressor surge can result in damage to the engine or its intake pipe system.

Thus, there exists a need for an improved apparatus and method for providing compressed fluid, such as in a turbocharger, while reducing the occurrence of compressor surge. In some cases, the prevention of compressor surge can expand the useful operating range of the compressor.

BRIEF SUMMARY OF THE DISCLOSURE

Embodiments disclosed herein may address some of the above discussed disadvantages, while potentially providing other advantages, by providing a novel compressor and/or compressor housing. A compressor includes compressor blades that impart to a fluid a momentum along a main gas flow direction and a swirl. The compressor housing directs re-circulated fluid to have components along the main gas flow direction and opposed to the swirl. Such directing of re-circulated fluid may modify or improve an aspect of compressor performance, and in particular may beneficially impact the surge phenomenon.

One aspect of the disclosure is directed to a housing for a compressor. Specifically, the housing is incorporated as part of a compressor having blades that impart to a fluid a momentum along a main gas flow direction and a swirl. The housing includes a channel that has at least one channel wall and defines an axis substantially aligned with the main gas flow direction. The channel is configured to duct the fluid. The channel wall defines an internal cavity that extends axially within, and may also extend circumferentially around, the channel wall. A bleed passage connects and provides fluid communication between the channel and the cavity. The channel wall defines at least one injection passage, or in some cases a plurality of injection passages, providing fluid communication between the cavity and the channel at a location spaced in a direction opposite the main gas flow direction from both the bleed passage and the blades. The injection passages may be distributed circumferentially, and perhaps equidistantly, around the channel wall, or may be distributed in an area array along the channel wall. In one embodiment, the injection passages include tubular holes through or straight through the channel wall. The injection passages have a portion configured to direct fluid from the cavity into the channel with a component along the main gas flow direction and a component opposed to the swirl. The injection of the recirculated fluid with an axial component and a swirl component opposite to the rotation of the compressor blades may serve to shift the surge line of the compressor to lower flow rates at a given pressure ratio.

Another aspect of the disclosure is directed to a compressor. The compressor includes a row of compressor blades configured to rotate and thereby impart to a fluid a momentum along a main gas flow direction and a swirl. The compressor also includes a housing. The housing includes a channel defining an axis substantially aligned with the main gas flow direction, and a bleed passage. The channel is configured to duct at least some of the fluid, and has at least one channel wall that defines an internal cavity that extends axially within the channel wall. The bleed passage connects and provides fluid communication between the channel and the cavity. The channel wall defines a plurality of injection passages providing fluid communication between the cavity and the channel at a location spaced in a direction opposite the main gas flow direction from both the bleed passage and the blades. The injection passages may be distributed circumferentially, and perhaps equidistantly, around the channel wall, or may be distributed in an area array along the channel wall. The injection passages have a portion configured to direct fluid from the cavity into the channel with a component along the main gas flow direction and a component opposed to the swirl.

BRIEF DESCRIPTION OF THE SEVERAL VIEWS OF THE DRAWING(S)

Figure 1B:
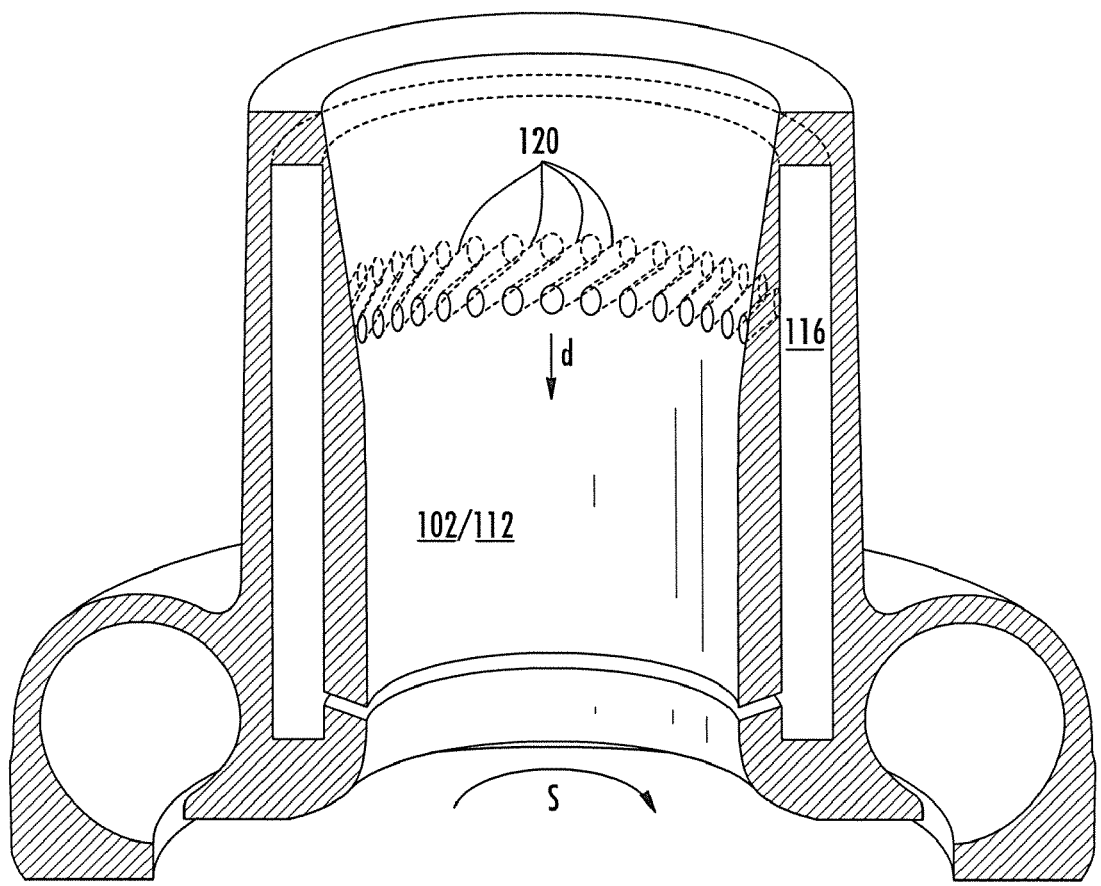
Figure 2:
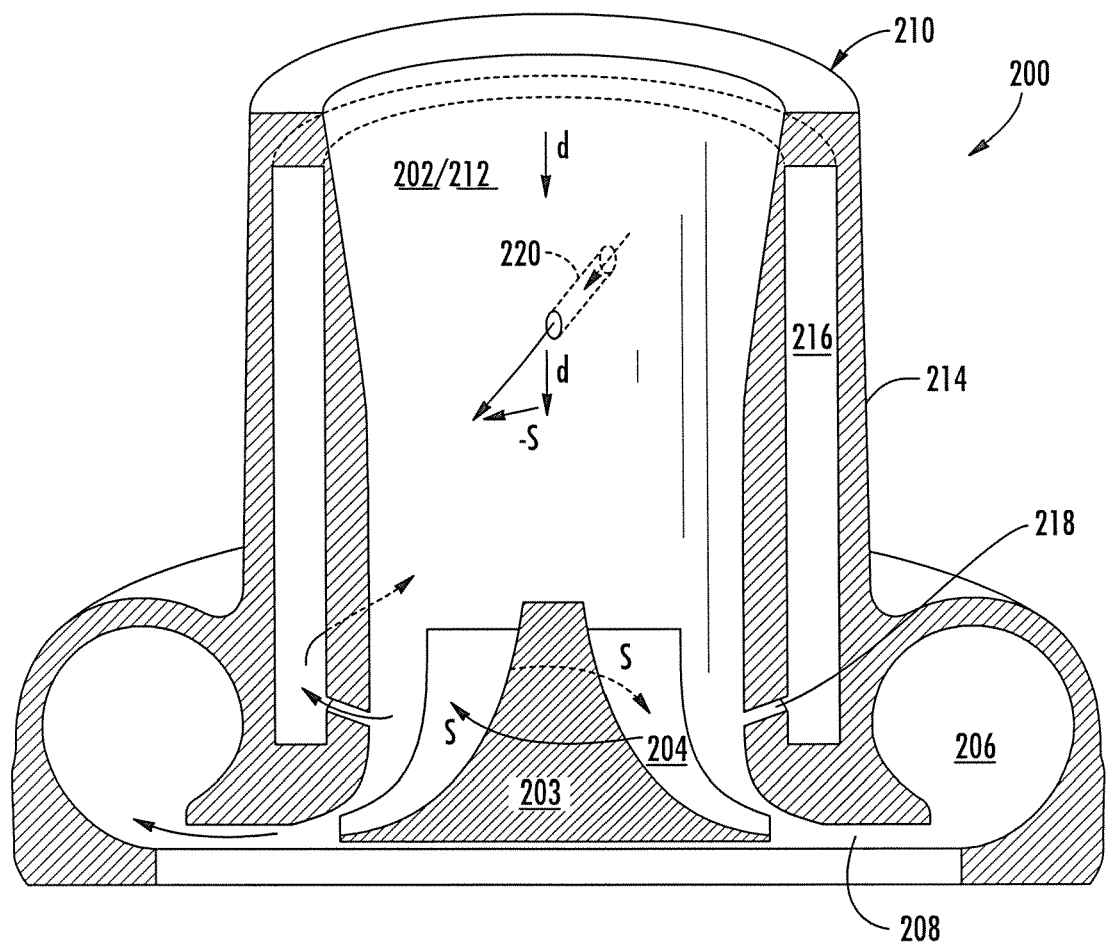

Having thus described the invention in general terms, reference will now be made to the accompanying drawings, which are not necessarily drawn to scale, and wherein:

FIG. 1A is a meridional cross-sectional view of a centrifugal compressor configured in accordance with an exemplary embodiment;

FIG. 1B is a cross-sectional perspective view of the compressor housing of FIG. 1A, in which the housing is isolated from compressor blades and many of the injection passages hidden for clarity; and FIG. 2 is a cross-sectional perspective view of a compressor configured in accordance with an exemplary embodiment, the figure schematically indicating the fluid flow pattern in the compressor during operation.

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIG. 1A, therein is shown a meridional cross-sectional view of a compressor 100, in this case a centrifugal compressor, configured in accordance with an exemplary embodiment. The compressor 100 includes a duct 102, which defines a main gas flow axis A. The compressor also includes a row of compressor blades 104 disposed towards an end of the duct 102. The compressor blades 104 extend from a hub 103 that is coupled to a shaft (not shown). The shaft is rotatable about axis A and is driven by a device such as a turbine or electric motor (not shown). Some embodiments of compressor blades 104 may define a blade leading edge 105a and a blade trailing edge 105b. As will be discussed in more detail below, the blades 104, when rotating, compress fluid, imparting to the fluid in (and proximal to) duct 102 a momentum along a main gas flow direction d generally aligned with the main gas flow axis A (as well as a swirl consistent with the direction of rotation of the blades). Surrounding the blades is a discharge volute 106, which fluidly communicates with the duct via a diffuser passage 108 and serves to receive much of the fluid compressed by blades 104. The compressed fluid is then passed from the discharge volute 106 to the point of use, such as the combustion chamber of an engine.

The compressor 100 also includes a housing 110, which may or may not be integrated with the duct 102. Housing 110 includes a channel 112 that is configured to duct at least some of the fluid being moved by the blades. In cases where duct 102 is integral with housing 110, duct 102 and channel 112 may coincide over substantially all of the axial length of housing 110, which in some embodiments may encompass the entire length of duct 102 (i.e., duct 102 and channel 112 are indistinguishable). Channel 112 defines an axis a that is substantially aligned with the main gas flow direction d.

Channel 112 has at least one channel wall 114 that defines an internal cavity 116. Internal cavity 116 extends axially within the channel wall 114, along axis a. Channel wall 114 may, for example, include an annular wall, or may include a plurality of walls that together form an annular structure. In such cases, internal cavity 116 may extend circumferentially within channel wall 114 as well as axially. A bleed passage 118 connects and provides fluid communication between channel 112 and cavity 116. Channel wall 114 also defines a plurality of injection passages 120 providing fluid communication between cavity 116 and channel 112. Injection passages 120 converge with channel 112 at a location spaced from bleed passage 118 in a direction opposite the main gas flow direction d. The point of convergence of injection passages 120 and channel 112 is also spaced from blades 104 in a direction opposite to d.

Referring to FIG. 1B, therein is shown housing 110 isolated from compressor blades 104 of FIG. 1A. While compressor blades are excluded from the figure, the direction of rotation of the blades is indicated by the swirl direction s. Each of the injection passages 120 extends from cavity 116 to channel 112 and has a portion directed with a component along the main gas flow direction d and a component opposed to the swirl s (i.e., a component along the direction –s). The injection passages illustrated in FIG. 1B are substantially straight, such that the entire injection passage is directed along d and –s. However, in other embodiments, the injection passages may have a curved or arcuate shape, with only a portion adjacent to the channel being directed along d and –s. In some embodiments, the injection passages may have a portion proximal to the cavity that is aligned with the prevailing direction of fluid flow in the cavity and another portion proximal to the channel directed along d and –s, perhaps with a smooth transition region therebetween. The extent to which each injection passage extends in either the d or –s directions can be tailored to the specific application, and it is not necessary that the geometries of all of the injection passages are uniform. The injection passages may have circular or elliptical cross-sections and form tubular holes, or may have some other cross-section.

In FIG. 1B, only a few of the injection passages 120 from FIG. 1A are shown for clarity. In some embodiments, channel wall 114 may define only one or a few injection passages 120. In other embodiments, injection passages may be distributed in a line along the axial direction, the circumferential direction, or some other direction, or may be disposed along a curve. In still other embodiments, the injection passages may be arranged in an area array, as shown in FIG. 1A, in which the injection passages are spaced apart both axially and circumferentially. Whether the injection passages are configured in a line, an array, or in some other pattern, the injection passages may or may not be equally spaced, depending on the application.

Referring to FIG. 2, therein is shown a cross-sectional perspective view of a compressor 200 configured in accordance with an exemplary embodiment, the figure schematically indicating the fluid flow pattern in the compressor during operation. The row of compressor blades 204 rotate around axis A in the direction s. The rotation of blades 204 causes fluid passing between blades 204 to rotate with a swirl s and to be compressed. Most of the compressed fluid enters discharge volute 206, from which the fluid moves to a location at which the compressed fluid will be utilized (e.g., the fluid may be ported to a combustion chamber of an engine). The overall movement of the fluid by blades 204 induces movement of fluid into and through duct 202/channel 212 in main gas flow direction d.

A portion of the fluid in channel 212 enters cavity 216 via bleed passage 218. The fluid travels through cavity 216 in a direction with a component opposed to direction d (i.e., in the direction –d) and with a component aligned with swirl s. Fluid enters and travels along injection passage 220 until the fluid is injected into channel 212. The injected fluid is directed with a component along the main gas flow direction d and a component –s opposed to the swirl s.

In accordance with at least some of the embodiments described herein, the re-circulated injected fluid is able to cause a redistribution of the flow field in the compressor. This can have a beneficial impact on the surge phenomenon. It is further believed that imparting to the re-circulated injected fluid both an axial velocity component and a rotational velocity component opposed to the swirl, through the acceleration of the fluid by the injection passages oriented as described above, contributes to the ability to beneficially impact the surge phenomenon.

Many modifications and other embodiments of the inventions set forth herein will come to mind to one skilled in the art to which these inventions pertain having the benefit of the teachings presented in the foregoing descriptions and the associated drawings. For example, while the previously described embodiments invoke a centrifugal compressor, various types of compressors may be configured consistently with the present disclosure, including any type of compressor that imparts both linear and angular momentum to a fluid being compressed thereby. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A housing for a compressor that compresses fluid, the compressor having blades that impart to a fluid a momentum having components along a main gas flow direction and a swirl direction, said housing comprising:
   a channel defining an axis substantially aligned with the main gas flow direction, said channel being configured to duct the fluid and having at least one channel wall, said at least one channel wall defining an internal cavity that extends axially and circumferentially within said at least one channel wall; and
   a bleed passage connecting and providing fluid communication between said channel and said cavity;
   wherein said at least one channel wall defines an array of injection passages providing fluid communication between said cavity and said channel at a location spaced from both said bleed passage and the blades in a direction opposite the main gas flow direction, wherein said array comprises injection passages spaced apart circumferentially and axially, and wherein each of said injection passages comprises a tubular hole through said at least one channel wall, said injection passages being oriented to direct fluid from the cavity into said channel with a component along the main gas flow direction and a component opposed to the swirl direction.

2. A housing according to claim 1, wherein said array of injection passages includes a plurality of rows of injection passages, each row having a plurality of injection passages spaced apart circumferentially, and said rows being spaced apart axially.

3. A housing according to claim 1, wherein each said tubular hole through said at least one channel wall is straight.

4. A compressor comprising:
   a row of compressor blades configured to rotate and thereby impart to a fluid a momentum having components along a main gas flow direction and a swirl direction; and
   a housing comprising:
      a channel defining an axis substantially aligned with the main gas flow direction, said channel being configured to duct at least some of the fluid and having at least one channel wall, said at least one channel wall defining an internal cavity that extends axially and circumferentially within said at least one channel wall; and
      a bleed passage connecting and providing fluid communication between said channel and said cavity, and
      wherein said at least one channel wall defines a plurality of injection passages providing fluid communication between said cavity and said channel at a location spaced from both said bleed passage and said row of compressor blades in a direction opposite the main gas flow direction, wherein said injection passages are spaced apart axially and circumferentially where said injection passages open into said channel, and each of said plurality of injection passages is configured to direct fluid from the cavity into said channel with a component along the main gas flow direction and a component opposed to the swirl direction.

5. A compressor according to claim 4, wherein said-plurality of injection passages a plurality of rows of injection passages, each row having a plurality of injection passages spaced apart circumferentially, and said rows being spaced apart axially.

6. A compressor according to claim 4, wherein said plurality of injection passages includes a plurality of tubular holes through said at least one channel wall.

7. A compressor according to claim 6, wherein the tubular holes through said at least one channel wall are straight.

8. A compressor according to claim 4, further comprising a duct configured to duct the fluid.

9. A compressor according to claim 8, wherein said channel is integrated with said duct.

* * * * *